(12) United States Patent
Brusa

(10) Patent No.: US 12,208,603 B2
(45) Date of Patent: Jan. 28, 2025

(54) COMPOSITE REINFORCING STRIP

(71) Applicant: HYPER FIBERS S.R.L., Argenta (IT)

(72) Inventor: Nicola Brusa, Argenta (IT)

(73) Assignee: HYPER FIBERS S.R.L., Argenta (IT)

( * ) Notice: Subject to any disclaimer, the term of this patent is extended or adjusted under 35 U.S.C. 154(b) by 0 days.

(21) Appl. No.: 18/027,460

(22) PCT Filed: Jul. 11, 2022

(86) PCT No.: PCT/IB2022/056375
§ 371 (c)(1),
(2) Date: Mar. 21, 2023

(87) PCT Pub. No.: WO2023/031692
PCT Pub. Date: Mar. 9, 2023

(65) Prior Publication Data
US 2023/0364882 A1    Nov. 16, 2023

(30) Foreign Application Priority Data

Aug. 30, 2021   (IT) .................. 102021000022499

(51) Int. Cl.
| | |
|---|---|
| *B32B 3/26* | (2006.01) |
| *B29C 48/18* | (2019.01) |
| *B32B 3/04* | (2006.01) |
| *B32B 3/30* | (2006.01) |
| *B32B 5/12* | (2006.01) |

(Continued)

(52) U.S. Cl.
CPC ............... *B32B 5/12* (2013.01); *B29C 48/18* (2019.02); *B32B 3/04* (2013.01); *B32B 3/266* (2013.01); *B32B 3/30* (2013.01); *E02D 31/004* (2013.01); *B29L 2007/008* (2013.01)

(58) Field of Classification Search
None
See application file for complete search history.

(56) References Cited

FOREIGN PATENT DOCUMENTS

| FR | 2953943 B1 | 4/2013 |
|---|---|---|
| FR | 3016904 B1 | 2/2016 |
| WO | 9511351 A1 | 4/1995 |

OTHER PUBLICATIONS

International Search Report and Written Opinion dated Oct. 28, 2022 from counterpart International Patent Application No. PCT/IB2022/056375.

*Primary Examiner* — Alexander S Thomas
(74) *Attorney, Agent, or Firm* — NIXON & VANDERHYE

(57) ABSTRACT

Composite reinforcing strip comprising:
a covering capsule surrounding a plurality of longitudinal channels developing parallel to a longitudinal development direction of the composite reinforcing strip and arranged in sequence between opposite lateral ends of said composite reinforcing strip,
a plurality of longitudinal reinforcing fibres arranged inside reinforcing channels of the plurality of longitudinal channels, and
a plurality of longitudinal permeable fibres arranged inside at least one permeable channel of the plurality of longitudinal channels.

The covering capsule has, at least at an upper surface of the covering capsule opposite to a lower surface of the covering capsule, a plurality of surface openings leading to the at least one permeable channel so as to define a fluid communication between the plurality of longitudinal permeable fibres and an external environment.

11 Claims, 3 Drawing Sheets

(51) Int. Cl.
*E02D 31/00* (2006.01)
*B29L 7/00* (2006.01)

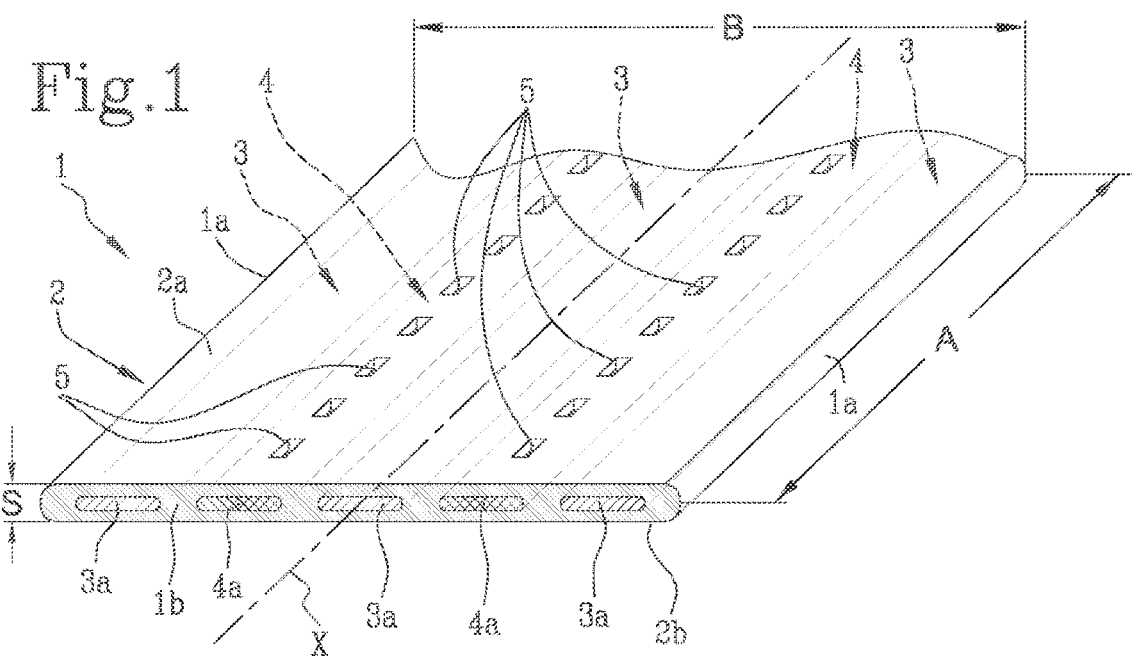
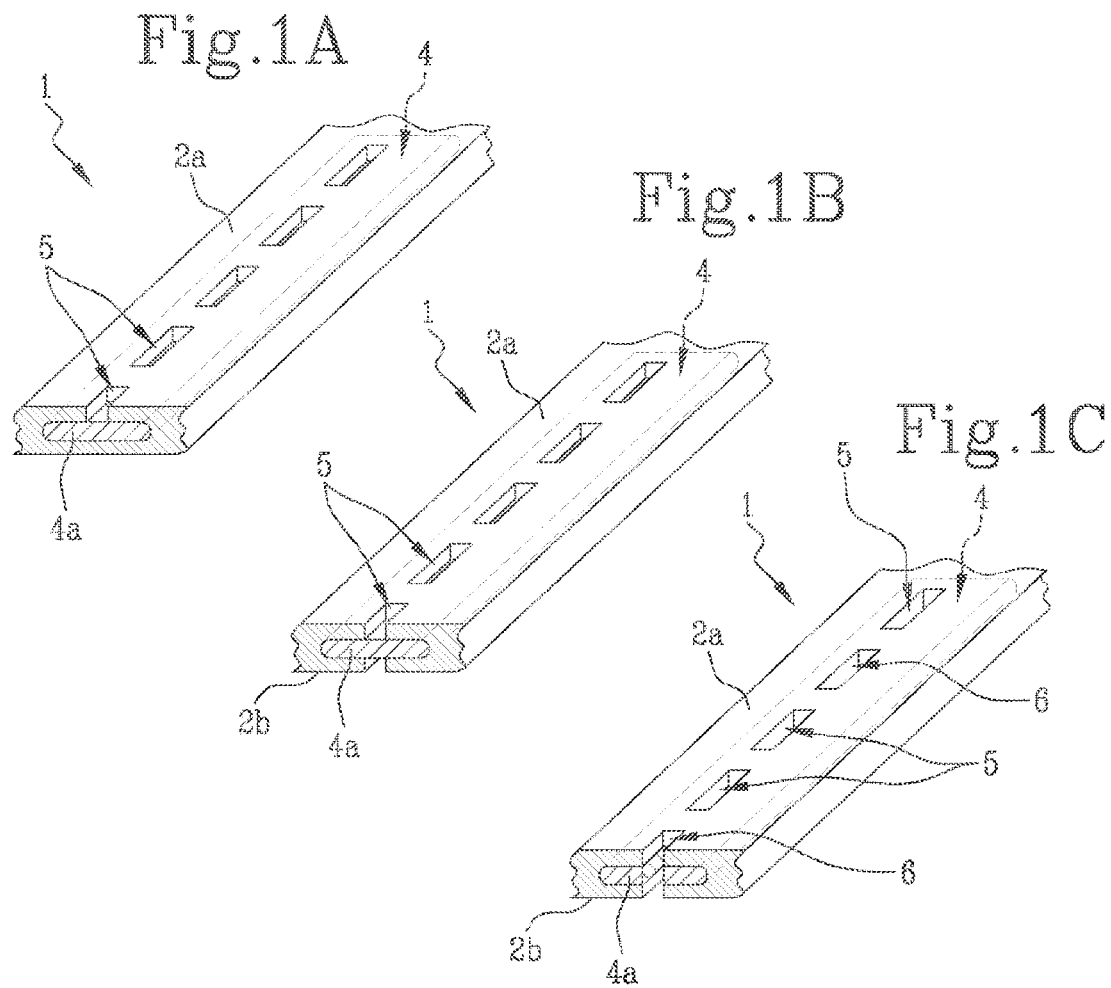

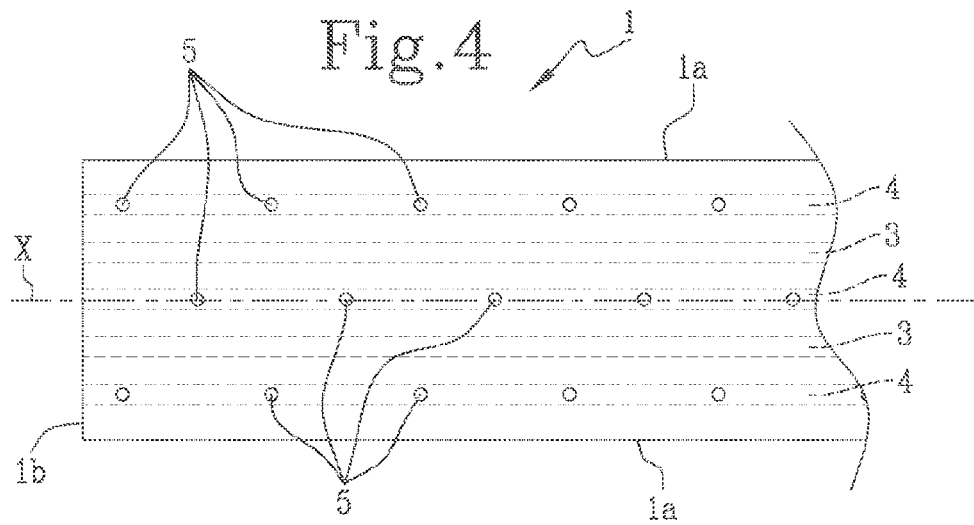
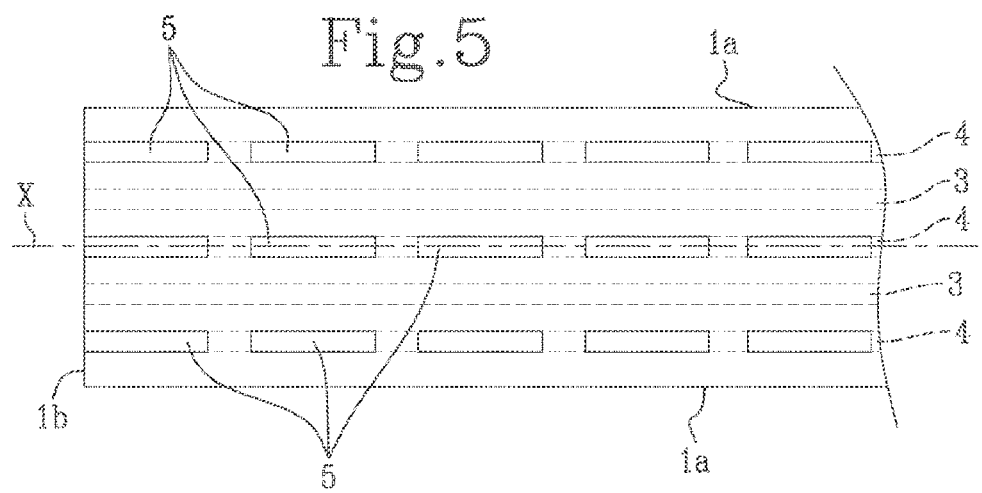
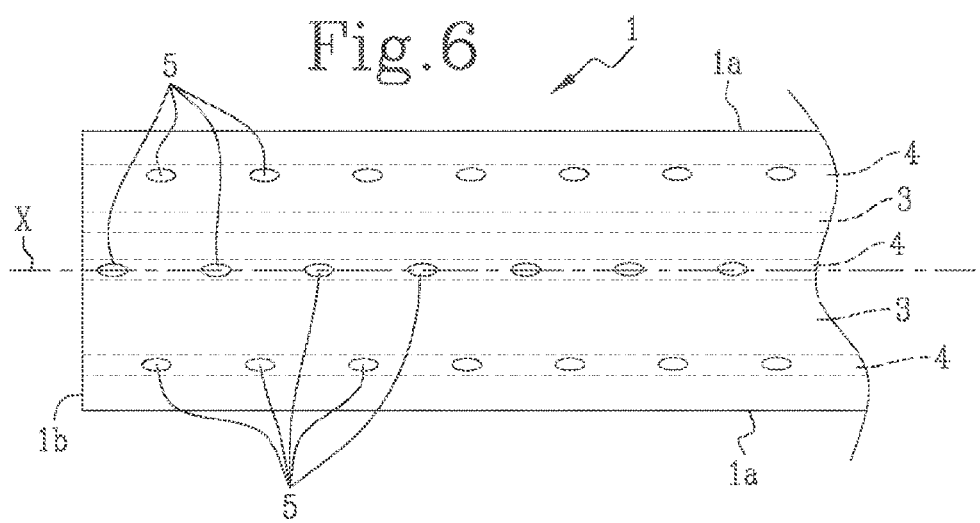

COMPOSITE REINFORCING STRIP

This application is the National Phase of International Application PCT/IB2022/056375 filed Jul. 11, 2022 which designated the U.S.

This application claims priority to Italian Patent Application No. 102021000022499 filed Aug. 30, 2021, which applications are incorporated by reference herein.

FIELD OF APPLICATION

The present invention has as its object a composite reinforcing strip.

In particular, the present invention has as its object a composite reinforcing strip that can be used in construction, civil, environmental, hydraulic, geotechnical and mining engineering, and more generally for all those applications where efficient reinforcement is required.

The invention further concerns the manufacturing process for making such a composite strip and the coupling of such a strip to form a composite material, e.g. in rolls.

PRIOR ART

The composite reinforcing strip referred to herein is a strip-shaped composite product (also referred to as a "strap" or "tape" or "geostrip") typically obtained by co-extrusion of a covering capsule containing a core of fibres, filaments, threads or inserts with tensile strength properties, used for various structural reinforcing or stabilising applications.

Without the invention having to lose its generality, reference will be now made to the use of the reinforcing strip for the construction industry, i.e. a strip of a type adapted to be inserted into the ground to reinforce it and thus create support walls or embankments reinforced both internally and at the base.

By using high-tenacity threads, yarns and fibres, it is in fact possible to obtain reinforcing strips that can offer the necessary support and resistance to loads and greater durability than ordinary structural construction methods and materials such as steel and concrete.

It is known that reinforcing strips can also serve as a basic product for creating products in rolls, i.e. combined in weft/warp, with tapes that are heat-sealed or glued together, to create a mesh or grid. The same reinforcing strips, applied individually, are known to be the basic product for the creation of tie rods and containment, lifting or stabilisation belts, when combined with terminals such as anchors, spikes or clamps.

The Applicant has noted that, however, strips of a known type have some limitations that in some cases prevent or discourage their use, especially in the construction world.

In fact, the Applicant has found that, disadvantageously to date, for the application of reinforcement and consolidation of soils and for the creation of escarpments and support walls, these strips known for working by friction are exclusively used with granular loose type soils or with chemically improved or mixed soils (e.g. stabilised with lime or cement), with specific grain size curve that allows an adequate interaction between strip and soil. This means that insitu soils, outside the specific grain size curve, cannot be used unless they are previously treated or altered in their characteristics. In fact, the insitu soils are often saturated with fine matrix of a cohesive/clayey nature.

The strips of known type, if combined in warp/weft for the creation of meshes or grids (also called geogrids) with medium and high resistance (>100 kN/m), are used for the reinforcement at the base of embankments on yielding (and usually saturated) soils. In this application, the strips of known type in weft/warp, require an additional separator filter between insitu soil and geogrid, as well as a frictional granular layer, therefore able to provide friction, filtration and drainage at the base of the embankment.

In general, the strips of known type are produced only with reinforcing channels inside which the longitudinal reinforcing fibres are arranged, and then wrapped by a totally encapsulated profile. If used as reinforcements, tie rods (soil nailing), straps for binding or for closing (clamp-straps), for the containment of materials or even for lifting, in closed and confined environments, these strips are not able to allow the dissipation of interstitial pressures, the filtration or the drainage of fluids present in the surrounding environment. The stripes of a known type therefore need additional means and methods to overcome these potential problems.

SUMMARY OF THE INVENTION

In this context, the technical task at the basis of the present invention is to propose a composite reinforcing strip that overcomes one or more of the drawbacks of the above-mentioned prior art, realizing a solution that is simple and inexpensive to produce, which is effective, convenient and reliable in use, and that reduces the risk of loss of effectiveness due to the production and installation method.

In particular, aim of the present invention is to make available a composite reinforcing strip that can be used within a confined environment (for example a soil), to allow the permeation of a fluid present in the confined environment and the correct disposal thereof, while maintaining the reinforcing properties of the strip unaltered and preventing damage due to interstitial pressures, condensation or humidity present in the environment.

The invention thus makes available a composite reinforcing strip that can also have drying, absorbing, conductive, draining or filtering capacities, ensuring precisely the reinforcement and at the same time an effective controlled permeability to fluids (whether they are gaseous or liquid depending on the type of application) from the surrounding environment.

In particular for applications in soils of a cohesive and clayey nature, or those so-called marginal soils, the strip object of the present invention would allow to effectively drain and filter the fluids contained in the soil.

The invention is advantageously applied in many and varied fields. For example in geotechnical engineering: during the compaction of cohesive and marginal soils, the dissipation of interstitial pressures is important in order to achieve the optimal water content and thus structurally safe soil. Or as an application in tie rods (soil nailing) where the strip is inserted by drilling into a mass (in this case a soil), reinforcing and providing an immediate channel for drainage and reduction of interstitial pressures. Or in the field of logistics where it is important to secure and block the transported goods through belts or strips but also to manage the humidity inside the closed environment (for example in containers). Or inside buildings or other structures such as silos or tanks, where it is necessary to support loads and manage possible condensation phenomena.

A further aim of the present invention is to propose a composite material comprising a plurality of composite reinforcing strips in accordance with the present invention that enables to optimize the installation steps and reduce the installation times, as well as to provide a solution for installation on large surfaces.

A further aim of the present invention is to propose a method for making a reinforcing strip that is simple and versatile so that it can be adapted in a practical and efficient manner to the design requirements and to the type of confined environment in which they are to be inserted.

The specified technical task and the specified purposes are substantially achieved by a composite reinforcing strip, a composite material and a method for making a composite reinforcing strip comprising the technical features set forth in one or more of the claims herein.

In particular, in a first aspect the present invention there is provided a composite reinforcing strip comprising a covering capsule surrounding a plurality of longitudinal channels developing parallel to the longitudinal development direction of the reinforcing strip and arranged in sequence between opposite lateral ends of the composite reinforcing strip, and a plurality of longitudinal reinforcing fibres arranged inside reinforcing channels of the plurality of longitudinal channels.

The composite strip also advantageously comprises a plurality of longitudinal permeable fibres arranged inside at least one drainage channel of the plurality of longitudinal channels. In other words, at least one channel of the plurality of longitudinal channels is of the "permeable" type, that is, comprising fibres, filaments or inserts such as to guarantee the passage of a fluid present in the surrounding environment and to allow draining, as well as filtering characteristics, instead of only reinforcing characteristics such as in the strips of the known type.

In particular, the covering capsule has, at least at its upper surface opposite to its lower surface (for example in applications in the construction field, the lower surface is that configured to be arranged or inserted, in use, resting on a soil), a plurality of surface openings leading to the at least one permeable channel.

Thanks to the presence of the surface openings, it is therefore possible to define a fluid communication between the plurality of longitudinal permeable fibres and the external environment.

Thanks to the presence of the surface openings, the permeable fibres contained in the permeable channels can in fact soak up the fluid present in the surrounding external environment and absorb the water or humidity contained therein (and possibly transfer it elsewhere, as will become clearer later in the description).

The reinforcing strip according to the present invention can therefore be advantageously employed without difficulty in closed masses (such as cohesive soils—by definition not draining) characterised by the presence of fluids, since the presence of permeable fibres exposed towards—and thus in direct contact with—the mass (i.e. at the surface openings) allows fluids to be effectively conveyed, and for example, for geotechnical type applications it guarantees an improvement in the characteristics of the soil itself and a correct structural reinforcement.

Thanks to the present invention it is in fact possible to thus provide privileged paths for fluids even in substantially undrained, non-permeable or non-conductive environments or soils.

Thus, instead of providing only longitudinal channels with a reinforcing function generally filled with polyester or aramid, as in the known solutions, according to the present invention at least one of the longitudinal channels (i.e. the one defined as "permeable channel") is "filled" (in particular "co-extruded", as will be clearer below) with fibres, filaments or inserts of permeable material (with absorbing, drying, filtering or draining properties depending on the type of application) and is in fluid communication with the surrounding external environment (e.g. the soil) through the surface openings, so as to allow a fluid passage from the surrounding environment to the composite reinforcing strip itself.

For earthmoving applications, for example, when the soil is compacted and compressed, the permeable material encapsulated in the strip allows an optimal dissipation of interstitial pressures outwards and thus an improvement in the compaction characteristics of the soil.

In a second aspect, the invention provides a composite reinforcing material comprising at least one sheet made of flexible (or semi-rigid) material and a plurality of reinforcing strips, of the type object of the present invention, coupled to the sheet at the respective lower surfaces of the covering capsules so that the respective longitudinal development directions are parallel. The composite reinforcing material is therefore already "ready for use" to be laid and installed for structural reinforcement.

Advantageously, when dealing, for example, with non-draining soils, often soft and saturated, it is in fact advisable to also lay a flexible sheet as a support for the construction operations that acts as a separator, between the same soil and any material laid subsequently.

The single sheet laid separately, without coupling to the strips, can involve a double processing and in any case generate a layer of discontinuity between the two elements.

The composite material of the present invention therefore facilitates laying operations as it is already pre-coupled and ready for use.

In a third aspect, the invention further provides a method for making a composite reinforcing strip comprising the steps of:

extruding a material, preferably polymeric or bio-polymeric, along an extrusion direction to make a covering capsule surrounding a plurality of longitudinal channels developing parallel to the longitudinal development direction of the composite reinforcing strip and arranged in sequence between opposite lateral ends of the reinforcing strip, wherein the extrusion direction being parallel to the longitudinal development direction of the composite reinforcing strip;

extruding a plurality of longitudinal reinforcing fibres inside reinforcing channels of the plurality of longitudinal channels;

extruding a plurality of longitudinal permeable fibres inside at least one permeable channel of the plurality of longitudinal channels;

making, after the extrusion steps, on an upper surface of the covering capsule opposite to a lower surface of the covering capsule, a plurality of surface openings leading to the at least one permeable channel.

Advantageously, therefore, the step of making the surface openings allows providing a fluid communication between the permeable channels of the reinforcing strips and the external environment during use, in order to absorb (and possibly transfer elsewhere) the fluids contained in the external environment.

Depending on the application characteristics, if for example we consider a soil we are talking about geotechnical characteristics, or the type of consolidation required by the design, thanks to the present invention, after defining the most suitable type of fibres, filaments or inserts to be used and the best performing layout/pattern for the specific application scenario, it is possible to quickly produce the required joining strip.

The dependent claims herein incorporated for reference, correspond to different embodiments of the invention.

Further features and advantages of the present invention will become clearer from the indicative, and therefore non-limiting, description of a preferred but non-exclusive embodiment of a composite reinforcing strip and of a composite material in roll, as shown in the accompanying drawings.

BRIEF DESCRIPTION OF THE DRAWINGS

FIG. 1 is a schematic perspective view of a composite reinforcing strip in accordance with the present invention.

FIGS. 1A, 1B and 1C are schematic perspective views of a portion of the reinforcing strip of FIG. 1 in accordance with three different embodiments of the surface openings.

FIGS. 4, 5 and 6 are schematic views from above of a reinforcing strip according to the present invention, in accordance with three different embodiments and layouts of the surface openings.

DETAILED DESCRIPTION

Figure 2:
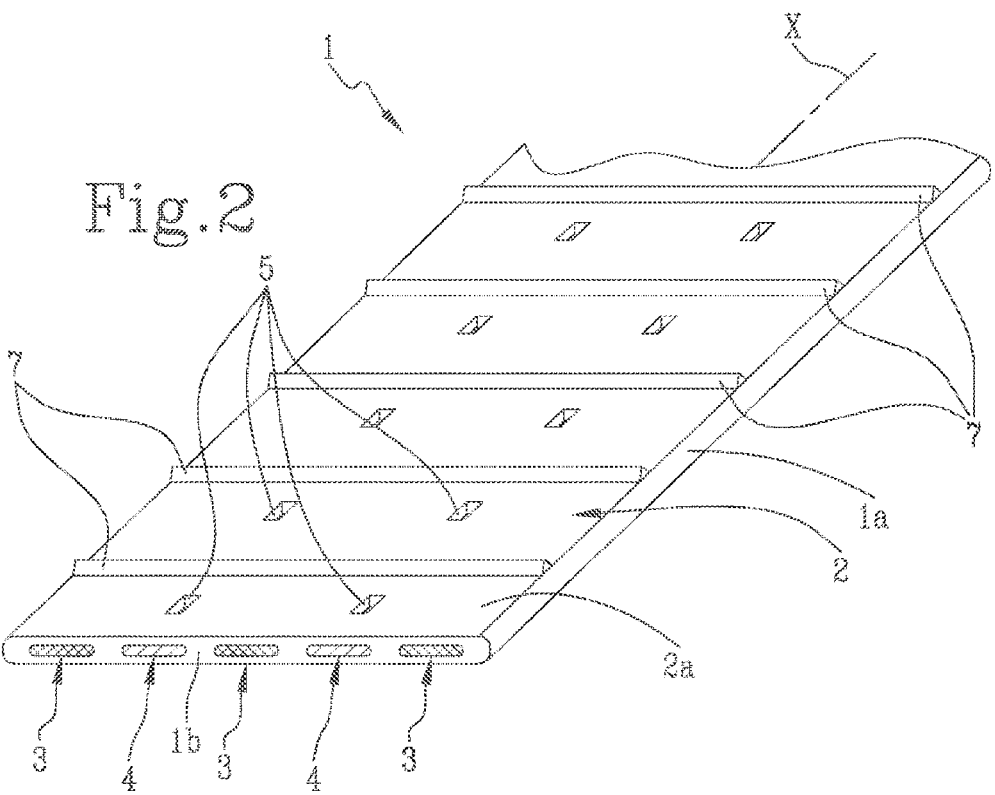
FIG. 2 is a schematic perspective view of a reinforcing strip in accordance with an alternative embodiment of the present invention.

With reference to the accompanying Figures, 1 denotes a composite reinforcing strip, also referred to simply as strip 1.

With reference to FIG. 1, it should be noted that the term "strip" is intended to denote a substantially flat strip-like element having a length A, measured along a longitudinal development direction X of the strip 1, greater than the width B of the strip 1, and having a width B much greater than the thickness S of the strip 1, the latter being measured perpendicularly with respect to the longitudinal development direction X and to the width B.

The strip 1 has two lateral ends 1a opposite the longitudinal development direction X and two terminal ends 1b opposite, perpendicular to the longitudinal development direction X. In other words, the length A is measurable between the terminal ends 1b, while the width B is measurable between the lateral ends 1a.

The strip 1 comprises a covering capsule 2, for example a polymer matrix, surrounding a plurality of longitudinal channels 3, 4 developing parallel to the longitudinal development direction X of the reinforcing strip 1 and arranged in sequence between the opposite lateral ends 1a.

In other words, the longitudinal channels 3, 4 are arranged parallel adjacent to each other in sequence within strip 1 and extend along the entire length A of the strip 1.

The strip 1 advantageously comprises:
 a plurality of longitudinal reinforcing fibres 3a arranged inside reinforcing channels 3 of the plurality of longitudinal channels 3, 4, and
 a plurality of longitudinal permeable fibres 4a arranged inside at least one permeable channel 4 of the plurality of longitudinal channels 3, 4.

In other words according to the present invention at least one longitudinal channel 3, 4 of the reinforcing strip 1 contains longitudinal permeable fibres 4a and therefore defines at least one permeable channel 4.

In particular, "plurality of longitudinal reinforcing fibres" 3a is intended to denote a yarn or a filament made from a plurality of fibres, threads, filament or inserts with tensile strength characteristics juxtaposed longitudinally to define a longitudinally developing reinforcing element.

Preferably, the longitudinal reinforcing fibres 3a are made of synthetic or polymeric or bio-polymeric or natural or vegetable materials. Inserts of ferrous or metallic origin can also be provided.

In particular, "plurality of longitudinal permeable fibres" 4a is intended to denote a yarn or filament made from a plurality of fibres, threads, filaments or inserts with characteristics of conductivity and fluid permeability juxtaposed longitudinally to define a longitudinally developing permeable element.

The permeability capabilities of the permeable fibres may vary based on the design requirements required for the specific application, whereby the permeable fibres may have different filtering, draining, absorbing, conductive, drying characteristics.

Preferably, the longitudinal permeable fibres 4a are made of polymers or bio-polymers, e.g. polypropylene, or other natural materials, e.g. cotton, jute, hemp etc.

It should therefore be noted that the term "longitudinal" is intended to denote that the plurality of fibres defines a yarn developing in a direction parallel to the longitudinal development direction X of the strip 1.

According to a possible embodiment, not shown, furthermore the plurality of fibres can be defined by threads or yarns formed by mixed or combined structures to form a yarn/hybrid structure ("commingled yarns" able to increase the final performance of the strip itself).

Advantageously, the covering capsule 2 has, at least at an upper surface 2a of the covering capsule 2—opposite to a lower surface 2b of the covering capsule—a plurality of surface openings 5 leading to the at least one permeable channel 4.

In other words, as can be clearly seen in FIG. 1A, the portion of the covering capsule 2 arranged above the permeable channel 4, therefore between the permeable channel 4 and the upper surface 2a, is at least partially perforated or incised to define the plurality of surface openings 5. The permeable fibres 4a are thus exposed inside the surface openings 5 and in fluid communication with the external environment, for example with the soil—in the event that the strip 1 is inserted into a soil (not shown) that in use will overlay the strip 1.

Preferably, moreover, each permeable channel 4 is open at least at one terminal end 1b of the reinforcing strip 1 so that the plurality of longitudinal permeable fibres 4a can convey a permeate fluid through the plurality of surface openings 5 towards the external environment.

For example, when the external environment is a soil, the plurality of permeable fibres may absorb and convey the fluid (not visible in the accompanying figures) collected through the plurality of surface openings 5 to the terminal end 1b for disposal thereof.

Preferably, the permeable channels 4 are open at both terminal ends 1b of the reinforcing strip 1 ensuring continuity and entry to the fluid.

With reference to FIG. 1, an embodiment example is shown wherein the reinforcing strip 1 comprises two permeable channels 4 and three reinforcing channels 3 alternating with each other, however it is possible to personalise the number and the arrangement of the longitudinal channels 3, 4 according to the design specifications and the type of external environment (for example soil) in which the strip 1 is to be inserted.

Preferably the reinforcing channel 3 has a width value, measured perpendicularly with respect to the longitudinal development direction X of the reinforcing strip 1 and parallel to the width B of the reinforcing strip 1, ranging between 0.5 mm and 100 mm, even more preferably ranging between 2 mm and 10 mm.

Preferably the reinforcing channel 3 has a thickness value, measured perpendicularly with respect to the longitudinal development direction X of the reinforcing strip 1 and parallel to the thickness S of the reinforcing strip 1, ranging between 0.1 mm and 20 mm, even more preferably ranging between 1 mm and 5 mm.

Preferably the permeable channel 4 has a width value, measured perpendicularly with respect to the longitudinal development direction X of the reinforcing strip 1 and parallel to the width B of the reinforcing strip 1, ranging between 0.5 mm and 100 mm, even more preferably ranging between 2 mm and 10 mm.

Preferably the permeable channel 4 has a thickness value, measured perpendicularly with respect to the longitudinal development direction X of the reinforcing strip 1 and parallel to the thickness S of the reinforcing strip 1, ranging between 0.1 mm and 20 mm, even more preferably ranging between 1 mm and 5 mm.

Preferably the distance between consecutive longitudinal channels 3, 4 is smaller than the width of the longitudinal channels 3, 4.

Preferably, the surface openings 5 have a depth value, measured perpendicularly with respect to the longitudinal development direction X of the reinforcing strip 1 and parallel to the thickness S of the reinforcing strip 1, ranging between 0.01 mm and 20 mm, which varies based on the thickness of each channel and the performance to be obtained.

Note in particular that the depth of the surface openings 5 is equal to the thickness of the portion of covering capsule 2 surrounding the permeable channels 4 above or below.

Preferably the surface openings 5 have a surface extension having a minimum value of 0.001 mm$^2$.

The shape and the pitch of the surface openings is widely personalisable, like the dimensional values also these parameters are to be determined firstly according to the draining capacity and efficiency that it is wished to be conferred to the strip 1 and to the surrounding environment, whether it is soil or other.

The pitch, the number, the shape, the depth of the surface openings 5, as well as the position and the number of the permeable channels 4 is variable based on the performance required by the design both from the point of view of conductivity/permeability/filtration/drainage but also from the point of view of the tensile strength of the reinforcing strip 1.

Preferably, a row of surface openings 5 is associated with each permeable channel 4, as shown in the accompanying embodiment examples.

As shown in FIG. 1, preferably if there are several drainage channels 4, the surface openings 5 of adjacent rows are aligned perpendicularly with respect to the longitudinal development direction X.

FIG. 4 shows an embodiment example of a strip 1 in which the shape of the surface openings 5 is circular and in which only the outer rows of surface openings 5 are aligned perpendicularly with respect to the longitudinal development direction X, while the central one is staggered. In FIG. 6, on the other hand, the shape of the surface openings 5 is ellipsoidal and the pitch of the surface openings 5 is higher.

FIG. 5 instead shows an embodiment example of a strip 1 in which the shape of the surface openings 5 is rectangular and in which preferably the surface extent of the surface openings 5 is greater than the surface extent of the portions of the covering capsule 2 interposed between the surface openings 5 of the same permeable channel 4. Furthermore, the head surface openings 5 preferably lead to the terminal ends 1b of the strip 1.

With reference to FIG. 1B, preferably the plurality of surface openings 5 is also arranged at the lower surface 2b of the covering capsule 2. Advantageously in this way it is possible to increase the conductivity and permeability capabilities of the fluid passing through the strip 1.

In particular, even more preferably the surface openings 5 made at the upper surface 2a are aligned with the surface openings 5 made at the lower surface 2b.

With reference to FIG. 1C, preferably the reinforcing strip 1 may have a plurality of through holes 6 between the upper surface 2a and the lower surface 2b of the covering capsule 2 at the permeable channels 4. In other words, unlike the surface openings 5 which internally lead to the permeable fibres 4a, in the case of holes 6 there is no material so the draining fibres 4a at that point are interrupted within the permeable channel 4. Thus, the hole of 6 defines a through opening from side to side of the strip 1 along its entire thickness S.

The number of holes 6 is a function of the design choices and requirements; for example, in FIG. 1C, a hole 6 is alternatively arranged every two surface openings 5.

According to a possible embodiment of the strip 1 according to the present invention, shown in FIG. 2, preferably the covering capsule 2 comprises a plurality of surface reliefs 7 arranged perpendicularly with respect to the longitudinal development direction X of the reinforcing strip 1.

In particular, each surface relief 7 extends at least partially between the lateral ends 1a of the strip 1 at least at the upper surface 2a of the covering capsule 2.

Advantageously, the realization of these surface reliefs 7, preferably by moulding, punching, marking or embossing, gives the strip 1 greater frictional and sliding performance, when arranged in use in the soil, increasing the resistance to slipping (so-called "pull-out" phenomenon) and improving the friction efficiency.

The profile of the surface reliefs 7 can be chosen as required, e.g. in FIG. 2 it is triangular in shape, but it could be rounded or rectangular in shape with variable centre distances, dimensions, thicknesses.

Figure 3:
FIG. 3 is a schematic perspective view of a composite reinforcing material in accordance with the present invention.

With reference to FIG. 3, according to a further aspect of the present invention there is provided a composite material 100 comprising at least one sheet 10 made of flexible or semi-rigid material, for example of geotextile material or multi-filament material, or a mesh or membrane, and a plurality of reinforcing strips 1 according to what has been previously described.

Advantageously, the reinforcing strips 1 are coupled to the sheet 10 at the respective lower surfaces 2b of the covering capsule 2 so that the respective longitudinal development directions X are parallel.

Preferably, the coupling of the sheet 10 with the strips 1 can be carried out according to one or more of the following production techniques: knitting, interweaving, bonding, stitching, interlocking, welding, gluing, heating, sewing, sprying.

Preferably, the composite material 100 can be made as a roll in order to optimize the transport spaces and facilitate the laying operations and potentially provide the strip 1 with a further means of collection and concentration of the fluids, which will be conveyed by the strip 1 itself as previously described.

According to a possible embodiment not shown in the accompanying figures, preferably furthermore the composite material 100 comprises a plurality of connecting strips coupled to the reinforcing strips 1 and arranged transversely, preferably perpendicularly, to the respective longitudinal development directions X of the reinforcing strips 1, so as to define a grid conformation, preferably of the warp and weft type.

Such a conformation may be useful in situations where permeability is required in both directions, increasing the effect of the strip object of the invention in distributing fluids within the mass (be it soil or other confined environment).

According to a further aspect of the present invention there is further provided a method for making a reinforcing strip 1 comprising the steps of:
- extruding a material, preferably polymeric or bio-polymeric, along an extrusion direction, parallel to the longitudinal development direction X of the composite reinforcing strip 1, to make the covering capsule 2 surrounding the plurality of longitudinal channels 3, 4;
- extruding the plurality of longitudinal reinforcing fibres 3a inside the reinforcing channels 3;
- extruding the plurality of longitudinal permeable fibres 4a inside at least one draining channel 4 of the plurality of longitudinal channels 3, 4;
- making, after the extrusion steps, on the upper surface 2a of the covering capsule 2 the plurality of surface openings 5 leading to the permeable channels 4, so as to define a fluid communication between the plurality of longitudinal permeable fibres 4a and the external environment.

Preferably, the plurality of surface openings 5 can be made by punching, engraving, cutting or die-cutting.

Preferably, the extrusion steps are carried out simultaneously (i.e. by co-extrusion), i.e. the covering capsule 2, the permeable fibres 4a and the reinforcing fibres 3a are co-extruded.

The present invention achieves the proposed purposes, overcoming the drawbacks complained about in the prior art and making available to the user a composite reinforcing strip 1 and a composite material 100 that are practical and efficient and that allow to convey fluids (whether they are gases or liquids) from a mass or confined environment to the outside, and a simple and versatile method for making the strip.

Advantageously, the composite reinforcing strip object of the invention, by resisting to traction, can not only withstand vertical loads, but also horizontal ones such as the wind, then being used in the open air, and be soaked, collecting or conveying fluids thanks to the at least one preferential channel (the permeable channel) designed therein. When used in external environments, the meshes or the strips of a known type have in fact no permeable or absorbing function and water particles are only accumulated on the surface.

The invention claimed is:

1. Composite reinforcing strip comprising:
   a covering capsule surrounding a plurality of longitudinal channels developing parallel to a longitudinal development direction of the composite reinforcing strip and arranged in sequence between opposite lateral ends of said composite reinforcing strip,
   a plurality of longitudinal reinforcing fibres arranged inside reinforcing channels of said plurality of longitudinal channels, and
   a plurality of longitudinal permeable fibres arranged inside at least one permeable channel of said plurality of longitudinal channels;
   said covering capsule having, at least at an upper surface of said covering capsule opposite to a lower surface of said covering capsule, a plurality of surface openings leading to the at least one permeable channel so as to define a fluid communication between the plurality of longitudinal permeable fibres and an external environment.

2. Composite reinforcing strip according to claim 1, wherein said plurality of surface openings are also arranged at the lower surface of the covering capsule.

3. Composite reinforcing strip according to claim 1, wherein said plurality of permeable fibres are made of polymers or bio-polymers; and wherein said plurality of longitudinal reinforcing fibres are made of synthetic or polymeric or bio-polymeric or natural or vegetable material.

4. Composite reinforcing strip according to claim 1, having a plurality of through holes between the upper surface and the lower surface of the covering capsule at the permeable channels.

5. Composite reinforcing strip according to claim 1, wherein the surface extent of the surface openings of is greater than the surface extent of the portions of the covering capsule interposed between the surface openings of the same permeable channel.

6. Composite reinforcing strip according to claim 1, wherein said covering capsule comprises a plurality of surface reliefs arranged perpendicularly with respect to the longitudinal development direction of the composite reinforcing strip, each surface relief extending at least partially between the lateral ends of said composite reinforcing strip at least at the upper surface of said covering capsule.

7. Composite reinforcing strip according to claim 1, wherein said at least one permeable channel is open at least at one terminal end of said composite reinforcing strip, arranged along the longitudinal development direction of said composite reinforcing strip, so that said plurality of longitudinal permeable fibres can convey a permeate fluid through said plurality of surface openings towards the external environment.

8. Composite material comprising at least one sheet made of flexible material and a plurality of composite reinforcing strips according to claim 1, said composite reinforcing strips being coupled to said sheet at respective lower surfaces of the covering capsules so that the respective longitudinal development directions are parallel.

9. Composite material according to claim 8, comprising a plurality of connecting strips coupled to the composite reinforcing strips and arranged transversely, preferably perpendicularly, to the respective longitudinal development directions of the reinforcing strips, so as to define a grid conformation.

10. Method for making a composite reinforcing strip comprising the steps of:
    extruding a material along an extrusion direction to make a covering capsule surrounding a plurality of longitudinal channels developing parallel to the longitudinal development direction of the composite reinforcing strip and arranged in sequence between opposite lateral ends of said reinforcing strip, said extrusion direction being parallel to the longitudinal development direction of the composite reinforcing strip;

extruding a plurality of longitudinal reinforcing fibres inside reinforcing channels of said plurality of longitudinal channels;

extruding a plurality of longitudinal permeable fibres inside at least one permeable channel of said plurality of longitudinal channels;

making, after said extrusion steps, on an upper surface of the covering capsule opposite to a lower surface of the covering capsule, a plurality of surface openings leading to the at least one permeable channel so as to define a fluid communication between the plurality of longitudinal permeable fibres and an external environment.

11. Method according to claim 10, in which said extrusion steps are carried out simultaneously.

* * * * *